(12) United States Patent
Olsen et al.

(10) Patent No.: US 7,872,676 B2
(45) Date of Patent: Jan. 18, 2011

(54) METHODS, SYSTEMS, AND DEVICES FOR OFFSET COMPENSATION IN CMOC IMAGERS

(75) Inventors: Espen A. Olsen, Irvine, CA (US);
Chiajen M. Lee, Irvine, CA (US);
Christopher Zeleznik, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 725 days.

(21) Appl. No.: 11/777,442

(22) Filed: Jul. 13, 2007

(65) Prior Publication Data

US 2009/0015692 A1 Jan. 15, 2009

(51) Int. Cl.
*H04N 5/76* (2006.01)
*H04N 5/217* (2006.01)
*H04N 9/64* (2006.01)
*H04N 5/335* (2006.01)
*H01L 27/00* (2006.01)

(52) U.S. Cl. .......... 348/231.99; 348/241; 348/243; 348/294; 348/300; 348/301; 250/208.1

(58) Field of Classification Search .......... 348/300, 348/241, 231.99, 243, 294, 308; 257/291
See application file for complete search history.

(56) References Cited

U.S. PATENT DOCUMENTS

| 6,166,367 | A * | 12/2000 | Cho .......... 250/208.1 |
|---|---|---|---|
| 6,529,237 | B1 * | 3/2003 | Tsay et al. .......... 348/241 |
| 6,587,143 | B1 * | 7/2003 | Boisvert .......... 348/241 |
| 6,967,509 | B2 | 11/2005 | Rossi |
| 7,148,833 | B1 | 12/2006 | Cho et al. |
| 7,157,683 | B2 | 1/2007 | Lee et al. |
| 7,319,419 | B1 * | 1/2008 | Lash et al. .......... 341/118 |
| 2004/0201417 | A1 * | 10/2004 | Shimizu et al. .......... 330/9 |
| 2004/0222351 | A1 * | 11/2004 | Rossi .......... 250/208.1 |
| 2004/0238372 | A1 | 12/2004 | Olsen |
| 2005/0118461 | A1 | 6/2005 | Olsen et al. |
| 2005/0253937 | A1 | 11/2005 | Moholt et al. |
| 2006/0006915 | A1 | 1/2006 | Yan et al. |
| 2006/0011807 | A1 | 1/2006 | Lee et al. |
| 2006/0061675 | A1 * | 3/2006 | Kim .......... 348/311 |
| 2006/0187329 | A1 | 8/2006 | Panicacci |
| 2006/0214085 | A1 | 9/2006 | Olsen et al. |
| 2006/0227226 | A1 | 10/2006 | Olsen |
| 2006/0231733 | A1 | 10/2006 | Boemier |
| 2006/0268140 | A1 | 11/2006 | Forbes et al. |

(Continued)

*Primary Examiner*—David L Ometz
*Assistant Examiner*—Quang V Le
(74) *Attorney, Agent, or Firm*—Traskbritt

(57) ABSTRACT

Methods, devices, and systems for offset compensation in an amplifier are disclosed, wherein the amplifier inputs may be exposed to large loads from an array of pixel columns coupled in parallel. During a sampling phase, an amplifier offset may be sampled by selectively coupling a first amplifier output to a first amplifier input and a second amplifier output to a second amplifier input. During a portion of the sampling phase, the first amplifier output may be buffered to a first storage element. During a different portion of the sampling phase, the second amplifier output may be buffered to a second storage element. To sense the pixel columns during an amplification phase, the first storage element and the second storage element are coupled to the first and second amplifier inputs, respectively, with the result that the amplifier offset is canceled from the amplifier output.

33 Claims, 7 Drawing Sheets

U.S. PATENT DOCUMENTS

2007/0040915 A1 2/2007 Suzuki et al.
2007/0045677 A1 3/2007 Lee et al.
2008/0074521 A1* 3/2008 Olsen .......................... 348/300

* cited by examiner

METHODS, SYSTEMS, AND DEVICES FOR OFFSET COMPENSATION IN CMOC IMAGERS

FIELD OF THE INVENTION

Embodiments of the present invention relate to amplifier circuits. More specifically, embodiments of the present invention relate to offset compensation in amplifiers used in semiconductor imaging devices.

BACKGROUND

Many systems include imaging devices to sense and capture optical images that can be electronically converted to a digital representation of the image. Image sensors include an array of photosensitive devices such as photodiodes or phototransistors fabricated on, for example, a silicon wafer. Each photosensitive device is sensitive to light in such a way that it can create an electrical charge that is proportional to the intensity of light striking the photosensitive device. The overall image captured by an image sensor includes many pixels arranged in an array such that each pixel detects the light intensity at the location of that pixel. A single pixel may include a single photosensitive device configured for detecting a broad frequency range, which may be used for gray scale images. In addition, a pixel may be defined as a single photosensitive device configured for detecting a specific color (i.e., frequency). Finally, a pixel may be defined as a group of photosensitive devices arranged near each other wherein different devices within the group are configured for detecting different colors. Thus, a full color image may be detected with the proper combination of color sensing pixels.

In a conventional complementary metal oxide semiconductor (CMOS) imager, each pixel cell in an array of pixels operates to convert light intensity to electrical charge, accumulate the electrical charge in proportion to the light intensity, and transfer the accumulated charge to an amplifier. In many CMOS imagers, a pixel may be reset to a specific reference voltage level prior to, or after, acquiring the image. This reference level may be used to compare a voltage level read from the pixel after exposure to light relative to the reference voltage level. With this configuration, a differential amplifier, or comparator, may be used to determine the difference between the exposed voltage level of a pixel and the reference voltage level of the pixel.

However, amplifiers used to amplify this difference generally include an offset voltage due to imbalances of the transistors, resistors, and other internal elements of the amplifier. This offset is difficult to predict and may change over process, temperature, and voltage variations. Furthermore, the offset may be amplified along with the intended signal, creating an even larger and unknown amount of offset on the amplified output signal.

Consequently, circuits and methods have been proposed for canceling this offset voltage so that the amplified output signal includes only amplification of the input signal and not the offset voltage. However, in image sensors, a single amplifier may be used for a large number of pixel columns to amplify the value from each pixel column in sequence. This large array of pixel columns may impose a large load on the input terminals of an amplifier. This large load may cause difficulties in using conventional offset cancellation techniques.

Therefore, there is a need for devices and methods for amplifier-offset compensation that can operate effectively with potentially large loads on the input signals, which may be attributable to an array of pixel columns coupled in parallel.

DETAILED DESCRIPTION

Embodiments of the present invention comprise methods, devices, and systems configured for offset compensation in an amplifier that may be exposed to large loads on the inputs due to, for example, an array of pixel columns coupled in parallel.

The following provides a more detailed description of the present invention and various representative embodiments thereof. In this description, circuits and functions may be shown in block diagram form in order not to obscure the present invention in unnecessary detail. Conversely, specific circuit implementations shown and described are illustrative only and should not be construed as the only way to implement the present invention unless specified otherwise herein. Additionally, block definitions and partitioning of logic between various blocks is illustrative of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal. Furthermore, the terms "assert" and "negate" are respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

Figure 1:
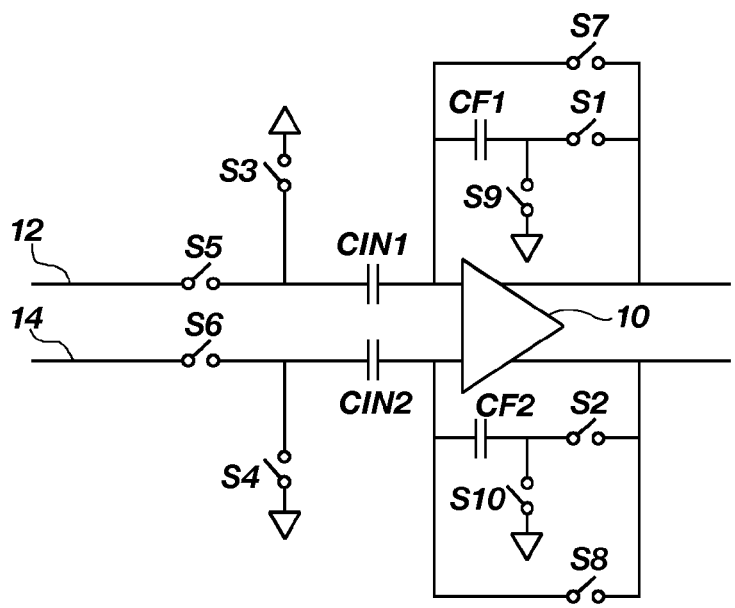
FIG. 1 is a circuit diagram of a conventional offset cancellation circuit for a differential amplifier.

FIG. 1 illustrates a circuit diagram of a conventional offset cancellation circuit for a differential amplifier 10. Feedback switches S1 and S2 and feedback capacitors CF1 and CF2 are coupled in series between the amplifier outputs and the amplifier inputs. Similarly, switches S7 and S8 are coupled between the amplifier outputs and the amplifier inputs. Switches S9 and S10 selectively couple one side of the feedback capacitors CF1 and CF2 to ground or a suitable reference voltage. Sampling capacitors CIN1 and CIN2 also are coupled to the amplifier inputs. On the other side of the sampling capacitors CIN1 and CIN2, switches S3 and S4 are coupled between the sampling capacitors CIN1 and CIN2 and ground, or another suitable reference signal. Switches S5 and S6 couple input signals 12 and 14, to sampling capacitors CIN1 and CIN2, respectively.

In operation, during a sampling phase, switches S5-S10 are closed, and switches S1-S4 are open. This places one side of the sampling capacitors CIN1 and CIN2 at input signals 12 and 14 and the other side of sampling capacitors CIN1 and CIN2 at the potential of the differential amplifier 10 inputs. In addition, with switches S7-S10 closed, the feedback capacitors CF1 and CF2 are precharged to the offset voltage of the differential amplifier 10, which is represented as the difference in voltage between the two input terminals of the differential amplifier 10. During a gain or readout phase, switches S5-S10 are open, and switches S1-S4 are closed. As a result, the precharged voltages on feedback capacitors CF1 and CF2 are subtracted from the output offset during the gain phase.

In conventional image sensor implementations, many sampling capacitors (CIN1 and CIN2) may be connected in parallel. As a result, it may be difficult, or impractical for the differential amplifier 10 to drive the large capacitive load during the sampling phase. In these implementations, a separate reference voltage driver (not shown) may be used to provide a constant reference voltage capable of driving the large capacitive load. However, in this conventional implementation, the reference voltage is not related to the offset voltage of the amplifier so there is no way to cancel the offset voltage.

The present invention, in a number of embodiments described herein, may be used in a number of applications including CMOS image sensors and may be configured to drive large loads onto signal sampling lines and still provide for overall offset sampling to allow for compensation of any amplifier offset during amplification.

Figure 2:
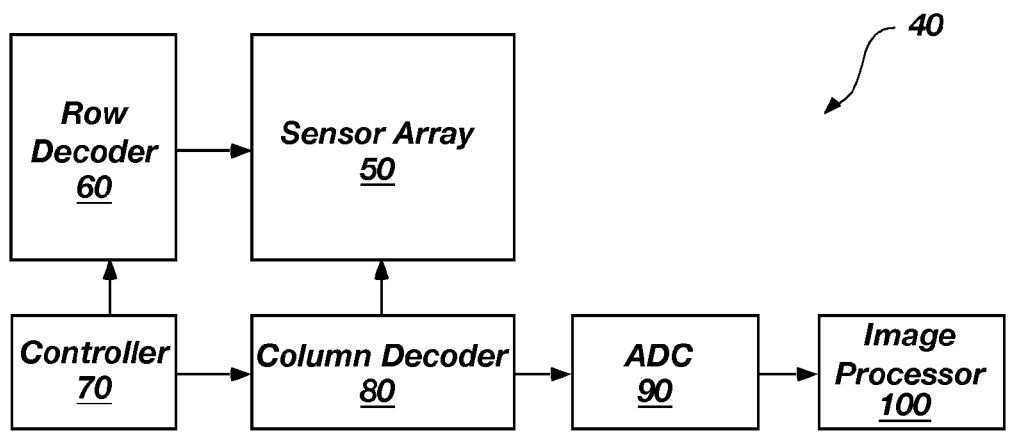
FIG. 2 is a simplified block diagram of a CMOS image sensor in accordance with an embodiment of the invention.

FIG. 2 is a simplified block diagram of a semiconductor imager 40 in accordance with a representative embodiment of the invention. The imager includes a sensor array 50, a row decoder 60, a column decoder 80, and a controller 70. The sensor array 50 (which may also be referred to as an array of pixels) includes photosensitive devices such as photodiodes or photo transistors fabricated on, for example, a silicon wafer. Each photosensitive device is sensitive to light in such a way that it can create an electrical charge that is proportional to the intensity of light striking the photosensitive device. The overall image captured by a sensor array 50 includes many pixels arranged in an array such that each pixel detects the light intensity at the location of that pixel.

As stated earlier, a single pixel may include a single photosensitive device configured for detecting a broad frequency range, which may be used for gray scale images. In addition, a pixel may be defined as a single photosensitive device configured for detecting a specific color (i.e., frequency). Finally, a pixel may be a group of photosensitive devices arranged near each other wherein different devices within the group are configured for detecting different colors. Thus, a full color image may be detected with an appropriate combination of color sensing pixels. The term pixel as used herein may refer to a single photosensitive device for detecting a broad range of frequencies, a single photosensitive device for detecting a narrow frequency band, or a combination of photosensitive devices configured to capture a color image at the location of the pixel. The pixels of the sensor array 50 are arranged in individually addressable rows and columns such that the row decoder 60 can address each row of the sensor array 50 and the column decoder 80 can address each column of the sensor array 50. While not illustrated with connections, it will be understood by those of ordinary skill in the art that the controller 70 may control functions of many or all of the other blocks within the image sensor. For example, the controller 70 may control the exposure of the sensor array 50 (i.e., capturing an image) and the sequencing of the row decoder 60 and column decoder 80 to read out the analog values at each pixel location within the sensor array 50.

While not limited to a certain sequence, generally, the row decoder 60 selects a specific row and the column decoder 80 then receives every pixel in the selected row in parallel. The column decoder 80 can then sequence through each pixel within the selected row to determine the charge on each pixel.

As the pixels are each individually addressed, the resulting analog signal from each pixel may be sequentially directed from the column decoder 80 to an analog-to-digital converter 90. The analog-to-digital converter 90 converts the analog signal for each pixel to a digital signal representing the intensity of light at that pixel. Analog-to-digital converter 90 may then supply the digitized pixel signals to an image processor 100, which forms and outputs a digital image.

Figure 3:
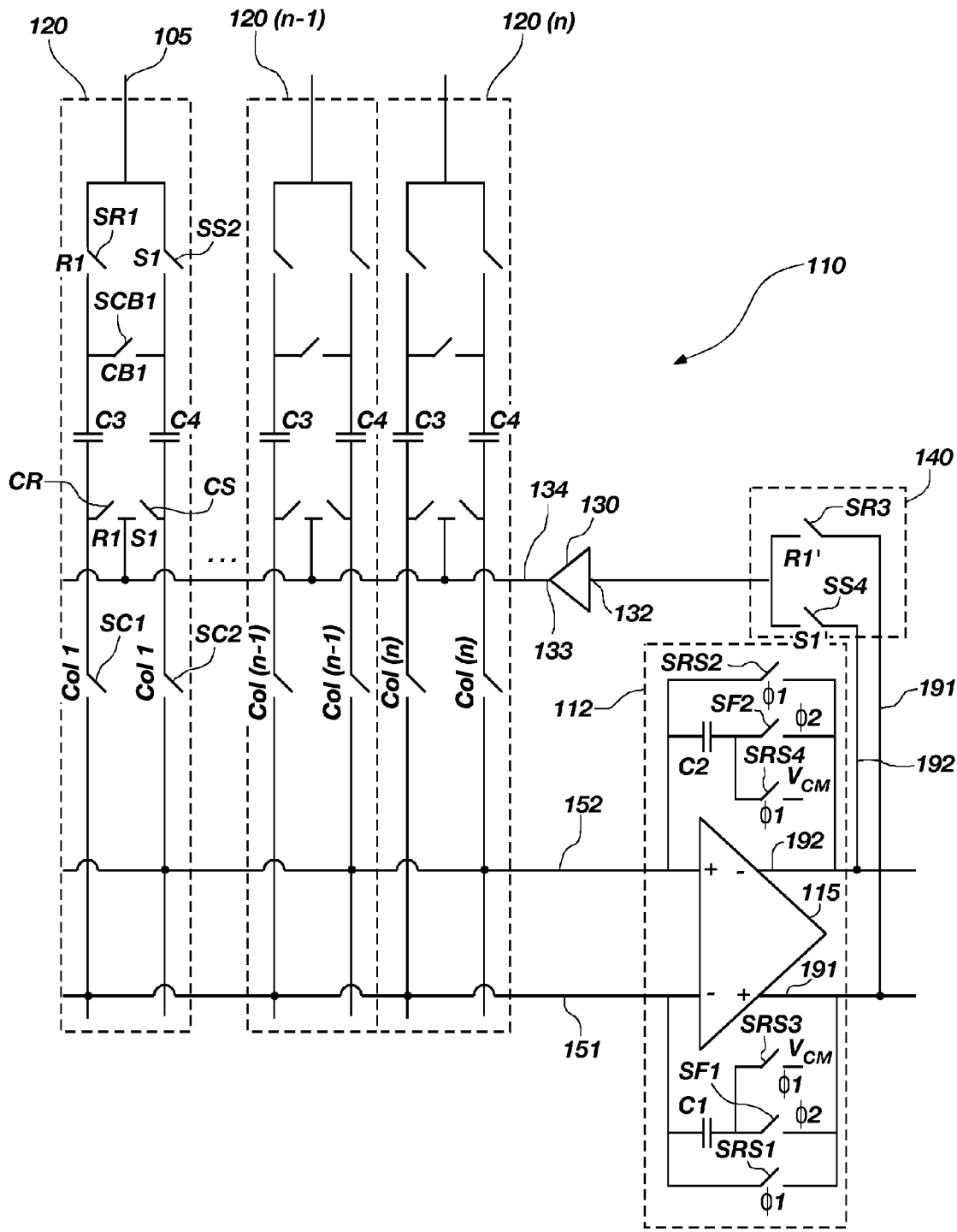
FIG. 3 is a circuit diagram of a pixel amplifier according to an embodiment of the invention.

FIG. 3 is a circuit diagram of a pixel amplifier 110, which is included within the column decoder 80 (see FIG. 2), in accordance with an embodiment of the invention. Each pixel column couples to a pixel sensor (120, ... 120(n−1), 120(n)). A column input, illustrated as column input 105 for the pixel sensor 120 is coupled to each pixel within the specific column. Generally, a pixel provides at least two signals to the pixel sensor 120. In addition, a pixel may provide two signal levels multiplexed onto one signal. A reset signal includes a charge in the pixel corresponding to a reset state of the pixel and a sense signal corresponding to a charge in a pixel after exposure to an image. In FIG. 3, these signals are multiplexed onto the single column input 105. However, while not shown, the present invention includes embodiments wherein the reset signal and sense signal may be separate physical signals to the pixel sensor 120 as will be apparent from the following description.

Each pixel sensor 120 includes reset sampling switch SR1 (which may also be referred to as a first pixel switch) and a sense sampling switch SS2 (may also be referred to as a second pixel switch). The reset sampling switch SR1 is used for selectively coupling the reset signal onto a reset capacitor C3 (which may also be referred to as a first storage element) and the sense sampling switch SS2 is used for selectively coupling the sense signal onto a sense capacitor C4 (may also be referred to as a second storage element). A crowbar switch SCB1 is coupled between the reset capacitor C3 and the sense capacitor C4 on the pixel column side of the pixel sensor 120. On the other side of the storage elements (i.e., the bus side), a first column switch SC1 selectively couples the reset capacitor C3 onto a first amplifier input 151 and a second column switch SC2 selectively couples the sense capacitor C4 onto a second amplifier input 152. The first column switch SC1 and second column switch SC2 may be referred to collectively as a column selector. Each pixel sensor 120 includes a first clamp switch CR for selectively coupling a reference signal 134 to reset capacitors C3 and a second clamp switch CS for selectively coupling reference signal 134 to sense capacitors C4.

Again stage amplifier 112 is also part of the pixel amplifier 110. The gain stage amplifier 112 includes a differential amplifier 115 with the first amplifier input 151, the second amplifier input 152, a first amplifier output 191, and a second amplifier output 192. A first feedback circuit couples the first amplifier output 191 back to the first amplifier input 151 and a second feedback circuit couples the second amplifier output 192 back to the second amplifier input 152. Each feedback circuit is similar and includes a first amplifier reset sampling switch SRS1 and SRS2 and a second amplifier reset sampling switch SRS3 and SRS4, a feedback capacitor C1 and C2, and a feedback switch SF1 and SF2.

The pixel amplifier 110 also includes a buffer element 130 and a buffer selector 140. Buffer element 130 includes a buffer input 132 and buffer output 133 and may provide the current required to drive the large load that may be present on the first amplifier input 151 and the second amplifier input 152 during various phases of operation as is explained more fully below. The buffer selector 140 includes a first buffer switch SR3 for selectively coupling the first amplifier output 191 to buffer input 132 and a second buffer switch SS4 for selectively coupling the second amplifier output 192 to the buffer input 132. Furthermore, buffer output 133 is operably coupled to reference signal 134 that may be selectively coupled to reset capacitors C3 by the first clamp switch CR. Similarly, the reference signal 134 may be selectively coupled to sense capacitors C4 by the second clamp switch CS.

The various switches are controlled by different signals that become active at different times during the column sensing process. These signals are: an amplifier reset signal $\Phi_1$, a gain select signal $\Phi_2$, a pixel-reset select signal R1, a pixel-sense select signal S1, a crowbar select signal CB1, and a column select signal Col1. Note that there is actually a separate column select signal (Col1, ... Col(n−1), and Col(n)) and a separate crowbar select signal (cb1, ... cb(n−1), cb(n)) for each column within the pixel array.

It should be noted that the pixel-sense select signal S1 includes an additional pixel-sense select signal S1' for controlling switches to the buffer element 130. Similarly, the pixel-reset select signal R1 includes an additional pixel-reset select signal R1' for controlling switches to the buffer element 130. While not necessary, these additional select signals S1' and R1' may be useful to ensure that the voltage related to the offset cancellation is stable at the input capacitors C3 and C4 during the reset phase and the sense phase. This can be seen from the timing diagram of FIG. 4, wherein the additional select signals S1' and R1' follow the same patterns as their counterpart signals S1 and R1, respectively, but transition before and after their counterpart signals S1 and R1. Generally, when describing the sequence of events, the discussions herein do not differentiate between the additional select signals S1' and R1' and their counterpart signals S1 and R1.

Figure 4:
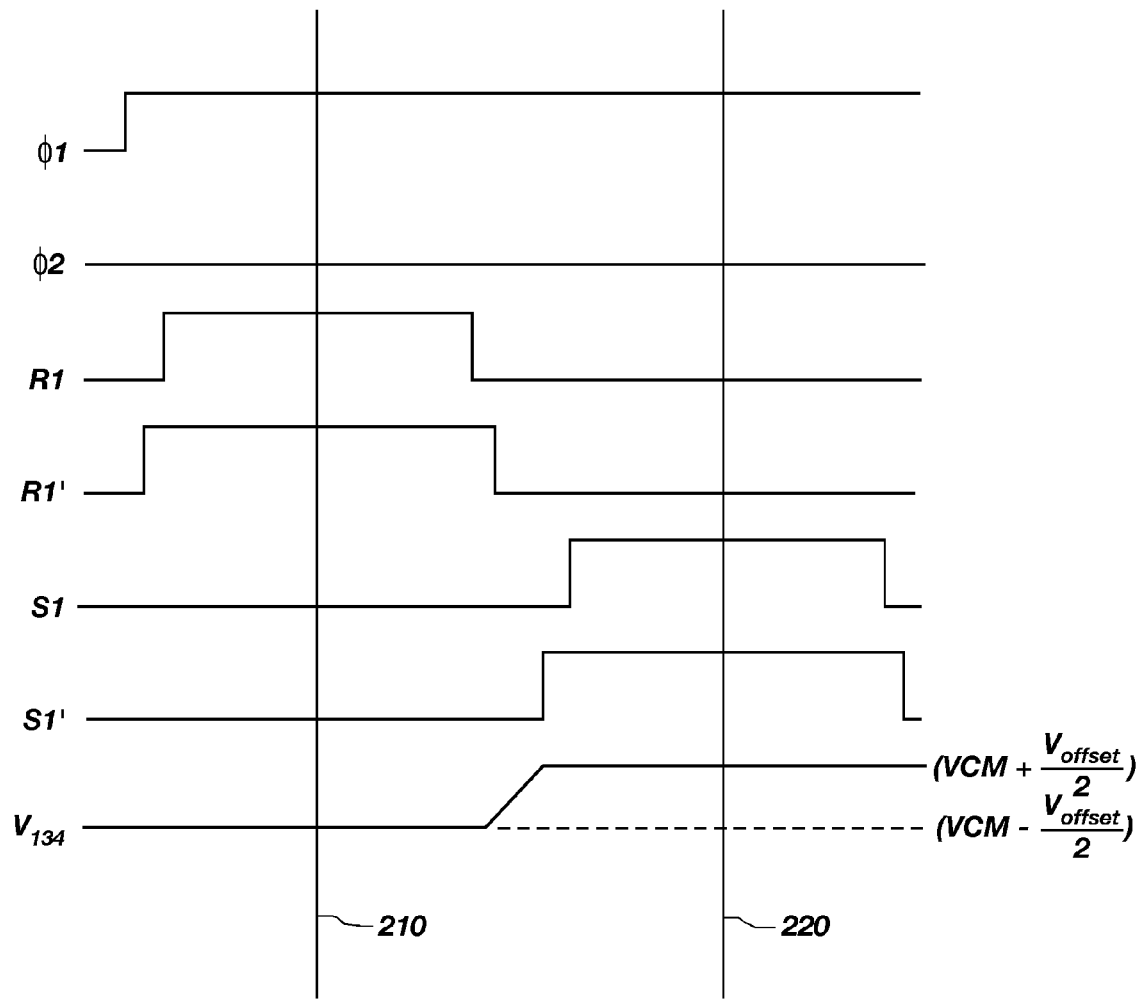
FIG. 4 illustrates a representative timing diagram of a pixel reset phase and pixel sense phase according to an embodiment of the invention.
Figure 5:
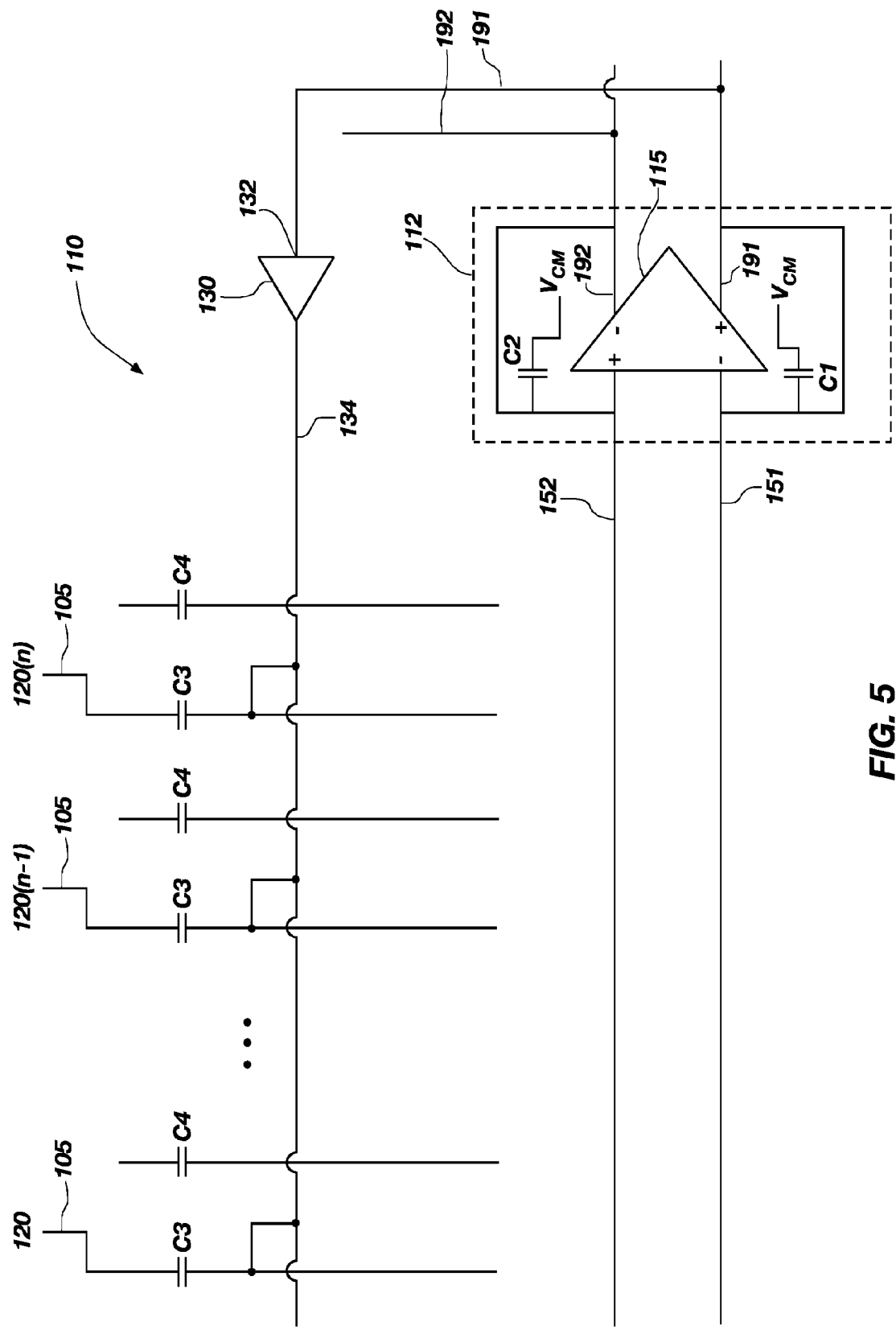
FIG. 5 is a partial circuit diagram of the pixel amplifier of FIG. 3, illustrating circuitry pertinent to a pixel reset phase.
Figure 6:
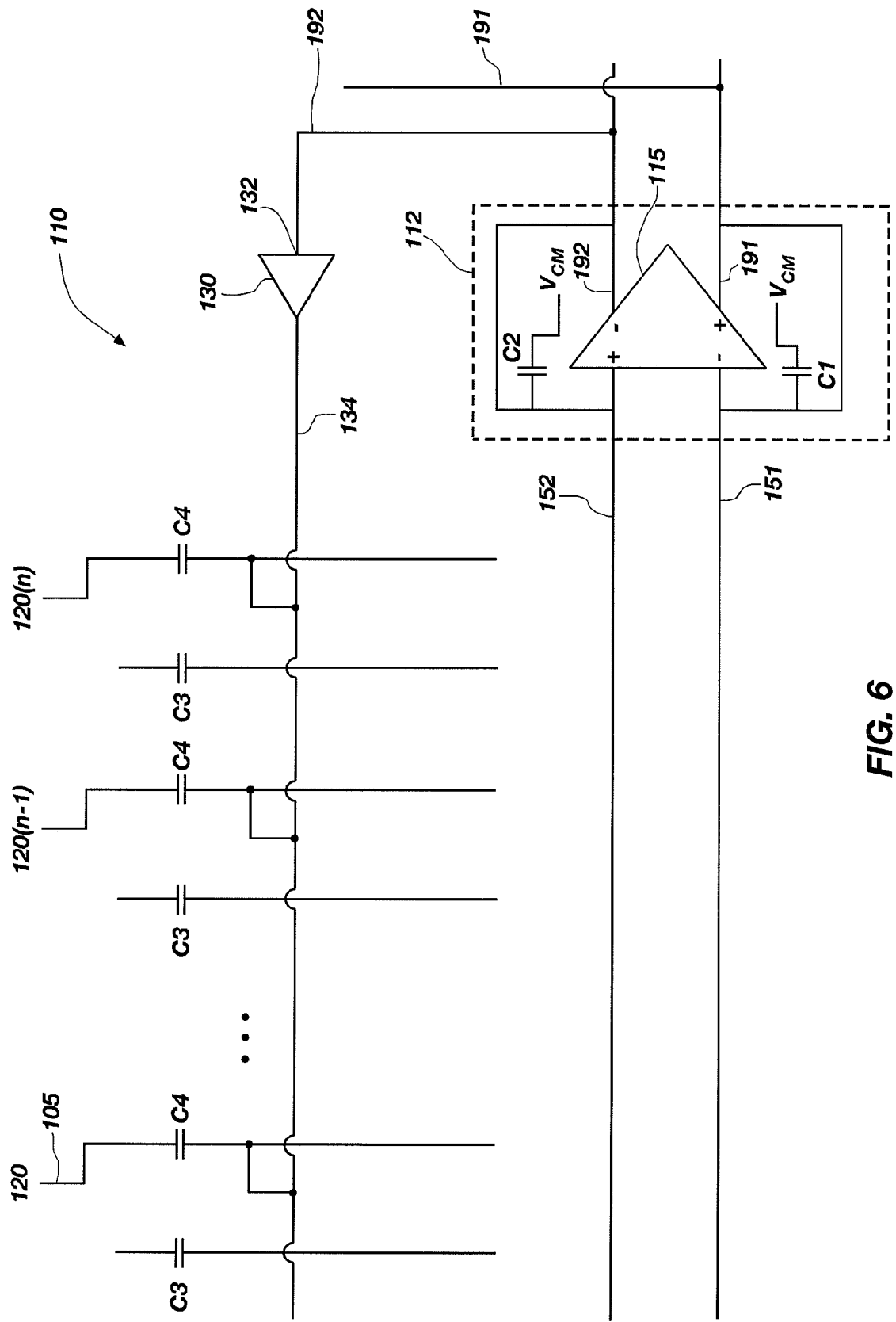
FIG. 6 is a partial circuit diagram of the pixel amplifier of FIG. 3, illustrating circuitry pertinent to a pixel sensing phase.
Figure 8:
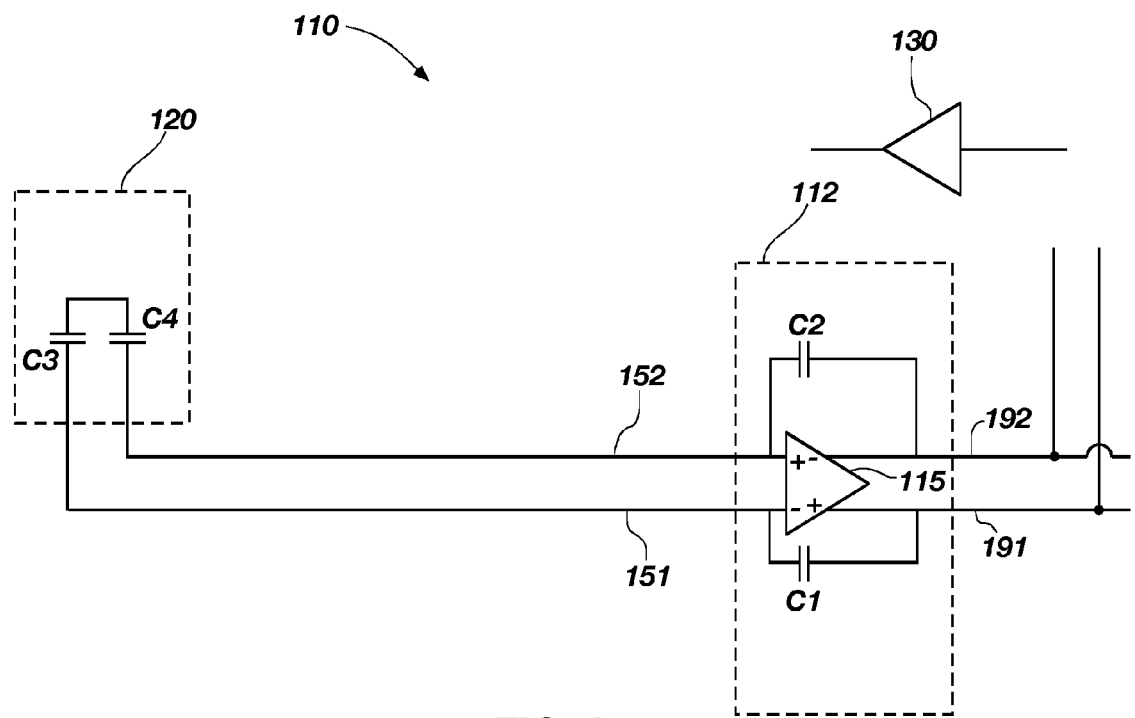
FIG. 8 is a partial circuit diagram of the pixel amplifier of FIG. 3, illustrating circuitry pertinent to a gain phase.
Figure 7:
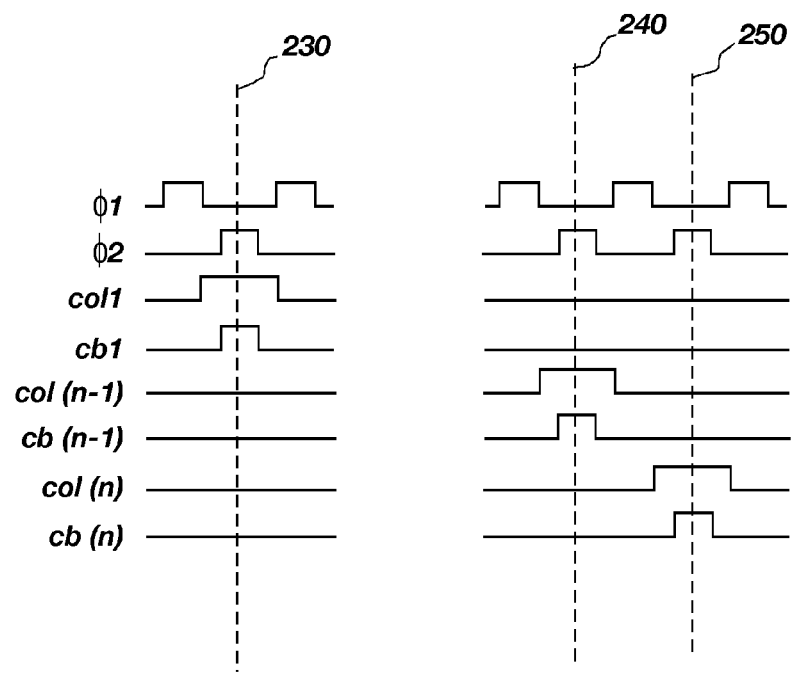
FIG. 7 illustrates a representative timing diagram of a gain phase according to an embodiment of the invention.

Operation of the pixel amplifier 110 will be discussed with reference to FIGS. 3-8. FIG. 4 illustrates a timing diagram pertinent to a reset phase 210 and a sensing phase 220. FIG. 5 is a partial circuit diagram of the pixel amplifier 110 of FIG. 3, illustrating circuitry pertinent to the reset phase 210. FIG. 6 is a partial circuit diagram of the pixel amplifier 110 of FIG. 3, illustrating circuitry pertinent to the sensing phase 220. FIG. 7 illustrates a timing diagram pertinent to a gain phase 230. Finally, FIG. 8 is a partial circuit diagram of the pixel amplifier 110 of FIG. 3, illustrating circuitry pertinent to the gain phase 230.

With reference to FIGS. 3 and 4, the pixel amplifier 10 may operate according to the sequence illustrated by the timing diagram of FIG. 4. At timing point 210, the amplifier reset signal $\Phi_1$ and the pixel-reset select signal R1 are active, while all the other switch control signals (S1, $\Phi_2$, CB1 Col1, ... Col(n−1), and Col(n)) are inactive. This phase, which may be referred to as the reset phase 210 or a first sampling phase, is used for sampling the reset state of the pixels in the currently selected row and performing offset compensation of the differential amplifier 115.

FIG. 5 is a partial circuit diagram of the pixel amplifier 110 of FIG. 3, illustrating circuitry pertinent to the pixel reset phase 210. In FIG. 5, the closed switches are shown as a connection and the open switches are shown as an open circuit. Consequently, it is easy to see the offset compensation function on the amplifier wherein the amplifier outputs 191 and 192 are fed back to the amplifier inputs 151 and 152 and one side of the feedback capacitors C1 and C2 is coupled to a reference voltage Vcm. This configuration leaves the amplifier offset as a difference in voltage between the first amplifier input 151 and the second amplifier input 152. In addition, the first amplifier output 191 is coupled to the buffer input 132 and the reference signal 134 is coupled to the reset capacitors C3. Furthermore, the column input 105 is coupled to a pixel terminal on one side of the reset capacitor C3. During the reset phase 210, the voltage on the first amplifier output 191 and, hence, the voltage on reference signal 134 is approximately equal to the reference voltage Vcm minus half the offset voltage of the amplifier. (i.e., $V_{134}$=Vcm−Voffset/2). Therefore, at the end of the reset phase 210, the reset capacitor C3 holds a voltage approximately equal to the pixel reset voltage on the column input 105 minus the voltage on reference signal 134. (i.e., Vr=Vpixel_reset−(Vcm−Voffset/2)).

With reference to FIGS. 3 and 4, at timing point 220, the amplifier reset signal $\Phi_1$ and the sense select signal S1 are active, while all the other switch control signals (R1, $\Phi_2$, CB1, Col1, ... Col(n−1), and Col(n)) are inactive. This phase, which may be referred to as the sense phase 220 or a second sampling phase, is used for sampling the sense state (i.e., the state of the pixel after exposure to an image) of the pixels in the currently selected row and performing offset compensation of the differential amplifier 115.

FIG. 6 is a partial circuit diagram of the pixel amplifier 110 of FIG. 3, illustrating circuitry pertinent to the pixel sense phase 220. In FIG. 6, the closed switches are shown as a connection and the open switches are shown as an open circuit. Consequently, it is easy to see the offset compensation function on the amplifier wherein the amplifier outputs 191 and 192 are fed back to the amplifier inputs 151 and 152 and one side of the feedback capacitors C1 and C2 is coupled to a reference voltage Vcm. This leaves the amplifier offset as a difference in voltage between the first amplifier input 151 and the second amplifier input 152. In addition, the second amplifier output 192 is coupled to the buffer input 132 and the reference signal 134 is coupled to sense capacitors C4. Furthermore, the column input 105 is coupled to a pixel terminal on one side of the sense capacitor C4. During the sense phase 220, the voltage on the second amplifier output 192 and, hence, the voltage on reference signal 134 is approximately equal to the reference voltage Vcm plus half the offset voltage of the amplifier. (i.e., $V_{134}$=Vcm+Voffset/2). Therefore, at the end of the sense phase 220, sense capacitor C4 holds a voltage approximately equal to the pixel sense voltage on the column input 105 minus the voltage on the reference signal 134. (i.e., Vs=Vpixel_sense−(Vcm+Voffset/2)).

FIG. 7 illustrates a timing diagram pertinent to the gain phase 230. This phase is used for amplifying the difference between the voltage on the column input 105 during the sense state and the reset state, while compensating for the differential amplifier offset. With reference to FIGS. 3 and 7, at timing point 230, the column select signal Col1 is active, column select signals (Col(n−1), Col(n)) are inactive, the gain select signal $\Phi_2$ is active, the crowbar select signal CB1 is active, while all the other switch control signals (R1, S1, cb(n−1), cb(n), and $\Phi_1$) are inactive.

FIG. 8 is a partial circuit diagram of the pixel amplifier 110 of FIG. 3, illustrating circuitry pertinent to the gain phase 230 for the first column. In FIG. 8, the closed switches are shown as a connection and the open switches are shown as an open circuit. Consequently, the input capacitors C3 and C4 are coupled to the amplifier inputs 151 and 152. In addition, the buffer element 130 is isolated from the rest of the circuit. Finally, the feedback capacitors C1 and C2 are coupled between the amplifier outputs and the amplifier inputs 151 and 152 such that the gain is defined as the ratio of the input capacitors C3 and C4 relative to the feedback capacitors C1 and C2. Of course, a wide variety of ratios (including a unity gain) may be selected within the scope of the invention, depending on circuit characteristics and the amplification desired.

With the configuration shown in FIG. 8 during the gain phase 230, the amplifier offset is cancelled and the amplified signal represents only the difference in voltage sensed on the column input 105 during the sense phase 220 relative to the voltage sensed on the column input 105 during the reset phase 210. In other words, the offset from the differential amplifier 115 has been effectively canceled and only the desired signals are amplified.

With reference to the timing diagram of FIG. 7, the timing points illustrated by lines 240 and 250 are the gain phases for the (n−1)$^{th}$ column and the n$^{th}$ column. In other words, after the sense phase 220 and reset phase 210, each pixel sensor 120 holds the proper state for the pixel in that column and the currently selected row. Thus, the process can sequentially step through a gain phase for each column to determine and amplify the signal difference between the sense phase 220 and the reset phase 210. As illustrated in FIG. 7, $\Phi_1$ is asserted and the offset voltage is therefore sampled onto capacitors C1 and C2 before the readout of each column (120, ... 120(n−1), 120(n)) within pixel amplifier 110.

It will be readily apparent to those of ordinary skill in the art that the switches described herein may be formed in a number of ways on a semiconductor device. By way of example, and not limitation, the switches may be formed as NMOS pass gates, PMOS pass gates, or CMOS pass gates.

As opposed to conventional amplifier-offset cancellation configurations, embodiments of the present invention provide for a limited amount of circuitry to achieve offset compensation in a first amplifier gain stage. Furthermore, undesired saturated amplifiers in the first and second gain stage as well as offset cancellation digital to analog converters (DACs) within a semiconductor imager may be reduced. Therefore, embodiments of the present invention limit design constraints and reduce the amount of area and power consumption within a semiconductor imager.

Figure 9:
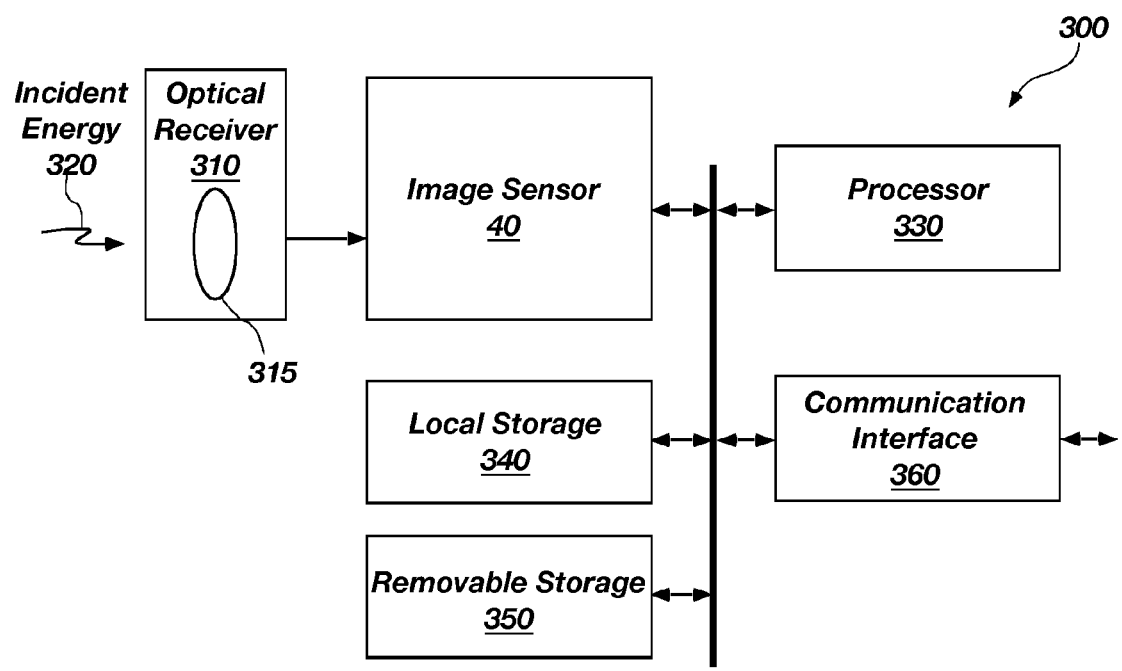
FIG. 9 is an imaging system diagram including an image sensor containing a pixel amplifier in accordance with an embodiment of the present invention.

FIG. 9 illustrates an imaging system 300 including a semiconductor imager 40 containing a pixel amplifier (not shown) according to the present invention. The imaging system 300 includes a processor 330 for receiving and modifying digital representations of images from the semiconductor imager 40. The imaging system 300 may also include an optical receiver 310 for channeling, focusing, or modifying incident energy 320, being visible light in one case, to present an optical image to the image sensor. For example, the optical receiver 310 may include a lens 315 for focusing the incident energy 320 onto the semiconductor imager 40.

The imaging system 300 may include a communication interface 360 for transmitting and receiving data. Finally, the imaging system 300 may include memory (340 and 350) in the form of local storage 340 and removable storage 350, such as, for example, Flash memory, magnetic recording media and optical recording media.

Without being limiting, such an imaging system 300 may include a computer system, camera system, scanner, machine vision, videophone, surveillance system, auto focus system, image stabilization system, and data compression system.

Specific embodiments have been shown by way of example in the drawings and have been described in detail herein; however, the invention may be susceptible to various modifications and alternative forms. It should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A method of sensing pixel columns, comprising:
    amplifying a first amplifier input to a first amplifier output and a second amplifier input to a second amplifier output;
    sampling an amplifier offset by selectively coupling the first amplifier output to the first amplifier input and selectively coupling the second amplifier output to the second amplifier input;
    selectively buffering the first amplifier output to a reference signal at least a portion of the time when the sampling occurs;
    selectively buffering the second amplifier output to the reference signal at least another portion of the time when the sampling occurs; and
    selectively coupling a first storage element to the first amplifier input and a second storage element to the second amplifier input at least a portion of the time when the amplifying occurs.

2. The method of claim 1, further comprising sensing a plurality of pixel columns, wherein each pixel column is sensed by:
    selectively coupling a column input to a first side of the first storage element at least a portion of the time when selectively buffering the first amplifier output occurs;
    selectively coupling the column input to a first side of the second storage element at least a portion of the time when selectively buffering the second amplifier output occurs; and
    selectively coupling the first side of the first storage element to the first side of the second storage element, the first amplifier input to a second side of the first storage element, and the second amplifier input to a second side of the second storage element at least a portion of the time when the amplifying occurs.

3. The method of claim 1, wherein amplifying a first amplifier input to a first amplifier output and a second amplifier input to a second amplifier output comprises coupling a first feedback capacitor between the first amplifier input and the first amplifier output and coupling a second feedback capacitor between the second amplifier input and the second amplifier output.

4. A method of sensing pixel columns, comprising:
    generating amplified outputs from amplifier inputs during a gain phase;
    sampling an amplifier offset and buffering a first amplifier output of the amplifier outputs to a reference signal during a first sampling phase;

sampling the amplifier offset and buffering a second amplifier output of the amplifier outputs to the reference signal during a second sampling phase; and coupling a first storage element to the first amplifier input and a second storage element to the second amplifier input during the gain phase.

5. The method of claim 4, further comprising sensing a plurality of pixel columns wherein each pixel column is sensed by:

coupling the first storage element between a column input and the reference signal during the first sampling phase;

coupling the second storage element between the column input and the reference signal during the second sampling phase; and coupling the first storage element and the second storage element in series and between the first amplifier input and the second amplifier input during the gain phase.

6. The method of claim 4, wherein generating amplified outputs comprises coupling a first feedback capacitor between the first amplifier input and a first amplifier output of the amplified outputs and coupling a second feedback capacitor between the second amplifier input and a second amplifier output of the amplified outputs.

7. The method of claim 4, wherein sampling the amplifier offset during the first sampling phase comprises coupling the first amplifier input to a first amplifier output of the amplified outputs.

8. The method of claim 4, wherein sampling the amplifier offset during the second sampling phase comprises coupling the second amplifier input to a second amplifier output of the amplified outputs.

9. A method of sensing pixel columns, comprising:

generating amplified outputs from amplifier inputs during a gain phase;

buffering a first amplifier output of the amplifier outputs to a first pixel signal during a first sampling phase comprising buffering a first amplifier output of the amplifier outputs to a first storage element during a first sampling phase; and buffering a second amplifier output of the amplifier outputs to a second pixel signal during a second sampling phase comprising buffering a second amplifier output of the amplifier outputs to a second storage element during a second sampling phase.

10. The method of claim 9, further comprising coupling the first storage element to the first amplifier input and the second storage element to the second amplifier input during the gain phase.

11. A pixel column sensor, comprising:

a reference signal;

a gain stage amplifier having a first amplifier input, a second amplifier input, a first amplifier output, and a second amplifier output, wherein the gain stage amplifier is configured for:

sampling an amplifier offset by coupling the first amplifier output to the first amplifier input and coupling the second amplifier output to the second amplifier input when an amplifier reset signal is asserted; and amplifying the first amplifier input and the second amplifier input when a gain select signal is asserted;

a buffer element including a buffer input and a buffer output; and a buffer selector configured for:

selectively coupling the first amplifier output to the reference signal when a pixel-reset select signal is asserted; and selectively coupling the second amplifier output to the reference signal when a pixel-sense select signal is asserted.

12. The pixel column sensor of claim 11, further comprising a plurality of pixel sensors, each pixel sensor of the plurality including:

a first storage element having a first terminal and a second terminal and configured for selectively coupling the first terminal to a column input when the pixel-reset select signal is asserted and selectively coupling the second terminal to the first amplifier input when a column select signal is asserted;

a second storage element having a first terminal and a second terminal and configured for selectively coupling the first terminal to the column input when the pixel-sense select signal is asserted and selectively coupling the second terminal to the second amplifier input when the column select signal is asserted;

a crowbar switch configured for selectively coupling the first terminal of the first storage element to the first terminal of the second storage element when a crowbar select signal is asserted; and a clamp selector configured for selectively coupling the reference signal to the second terminal of the first storage element when the pixel-reset select signal is asserted and selectively coupling the reference signal to the second terminal of the second storage element when the pixel-sense select signal is asserted.

13. The pixel column sensor of claim 12, wherein the clamp selector comprises:

a first clamp switch operably coupled between the reference signal and the second terminal of the first storage element and controlled by the pixel-reset select signal; and a second clamp switch operably coupled between the reference signal and the second terminal of the second storage element and controlled by the pixel-sense select signal.

14. The pixel column sensor of claim 11, wherein the buffer selector comprises:

a first buffer switch operably coupled between the first amplifier output and the buffer input and controlled by the pixel-reset select signal; and a second buffer switch operably coupled between the second amplifier output and the buffer input and controlled by the pixel-sense select signal.

15. A pixel column sensor, comprising:

a reference signal;

a differential amplifier having a first amplifier input, a second amplifier input, a first amplifier output, and a second amplifier output;

a first feedback circuit operably coupled between the first amplifier output and the first amplifier input and a second feedback circuit operably coupled between the second amplifier output and the second amplifier input, each of the first and second feedback circuits comprising:

a reset path configured to couple a feedback circuit input to a feedback circuit output; and a gain path configured to couple at least one feedback capacitor between the feedback circuit input and the feedback circuit output;

a buffer element including a buffer input and a buffer output;

a first buffer switch configured for selectively coupling the first amplifier output to the reference signal; and a second buffer switch configured for selectively coupling the second amplifier output to the reference signal.

16. The pixel column sensor of claim 15, further comprising:
a plurality of pixel sensors, each pixel sensor of the plurality including:
a first storage element having a pixel terminal and a bus terminal;
a second storage element having a pixel terminal and a bus terminal;
a first pixel switch configured for selectively coupling a column input to the pixel terminal of the first storage element;
a second pixel switch configured for selectively coupling the column input to the pixel terminal of the second storage element;
a crowbar switch configured for selectively coupling the pixel terminal of the first storage element to the pixel terminal of the second storage element;
a column selector configured for selectively coupling the bus terminal of the first storage element to the first amplifier input and selectively coupling the bus terminal of the second storage element to the second amplifier input; and
a clamp selector configured for selectively coupling the reference signal to the bus terminal of the first storage element and selectively coupling the reference signal to the bus terminal of the second storage element.

17. The pixel column sensor of claim 15, wherein:
the reset path of each of the first and second feedback circuits comprises a canceling switch operably coupled between the feedback circuit input and the feedback circuit output; and
the gain path of each of the first and second feedback circuits comprises:
at least one capacitive element;
a reset sampling switch configured to selectively couple one side of the at least one capacitive element to a reference voltage; and
a feedback switch configured to selectively couple the at least one capacitive element between the feedback circuit input and the feedback circuit output.

18. The pixel column sensor of claim 16, wherein the clamp selector comprises:
a first clamp switch operably coupled between the reference signal and the bus terminal of the first storage element and controlled by the pixel-reset select signal; and
a second clamp switch operably coupled between the reference signal and the bus terminal of the second storage element and controlled by the pixel-sense select signal.

19. A pixel column sensor, comprising:
a gain stage amplifier configured for:
sampling an amplifier offset by coupling a first amplifier output to a first amplifier input and coupling a second amplifier output to a second amplifier input when an amplifier reset signal is asserted; and
amplifying the first amplifier input and the second amplifier input when a gain select signal is asserted; and
a buffer selector configured for:
selectively coupling the first amplifier output to a pixel reset signal when a pixel-reset select signal is asserted; and
selectively coupling the second amplifier output to a pixel sense signal when a pixel-sense select signal is asserted.

20. The pixel column sensor of claim 19, further comprising a plurality of pixel sensors, each pixel sensor of the plurality including:
a reference signal;
a first storage element having a first terminal and a second terminal and configured for selectively coupling the first terminal to a column input when the pixel-reset select signal is asserted and selectively coupling the second terminal to the first amplifier input when a column select signal is asserted;
a second storage element having a first terminal and a second terminal and configured for selectively coupling the first terminal to the column input when the pixel-sense select signal is asserted and selectively coupling the second terminal to the second amplifier input when the column select signal is asserted;
a crowbar switch configured for selectively coupling the first terminal of the first storage element to the first terminal of the second storage element when a crowbar select signal is asserted; and
a clamp selector configured for selectively coupling the reference signal to the second terminal of the first storage element when the pixel-reset select signal is asserted and selectively coupling the reference signal to the second terminal of the second storage element when the pixel-sense select signal is asserted.

21. The pixel column sensor of claim 20, wherein the buffer selector is further configured for:
selectively coupling the first amplifier output to the second terminal of the first storage element when a pixel-reset select signal is asserted; and
selectively coupling the second amplifier output to the second terminal of the second storage element when a pixel-sense select signal is asserted.

22. A semiconductor imager, comprising:
a sensor array comprising a plurality of pixels arranged in a plurality of rows and a plurality of columns;
a row decoder operably coupled to the sensor array and configured for selecting each row of the plurality of rows; and
a column decoder operably coupled to the sensor array and configured for receiving in parallel, at least one signal from each pixel of a selected row, wherein the column decoder further comprises:
a reference signal;
a gain stage amplifier configured for canceling an amplifier offset when a amplifier reset signal is asserted and amplifying a first amplifier input and a second amplifier input when a gain select signal is asserted;
a buffer element including a buffer input and a buffer output; and
a buffer selector adapted to couple a first amplifier output to the reference signal upon assertion of a pixel-reset select signal and couple a second amplifier output to the reference signal upon assertion of a pixel-sense select signal.

23. The semiconductor imager of claim 22, wherein the column decoder further comprises a plurality of pixel sensors, each pixel sensor of the plurality including:
a first storage element having a first terminal and a second terminal and adapted to selectively couple the first terminal to a reset signal upon assertion of the pixel-reset select signal and selectively couple the second terminal to the first amplifier input upon assertion of a column select signal;
a second storage element having a first terminal and a second terminal and adapted to selectively couple the first terminal to a sense signal upon assertion of the pixel-sense select signal and selectively couple the second terminal to the second amplifier input upon assertion of the column select signal;

a crowbar switch adapted to selectively couple the first terminal of the first storage element to the first terminal of the second storage element upon assertion of a crowbar select signal; and a clamp selector adapted to selectively couple the reference signal to the second terminal of the first storage element upon assertion of the pixel-reset select signal and selectively couple the reference signal to the second terminal of the second storage element upon assertion of the pixel-sense select signal.

24. An imaging system, comprising:

a processor; and a semiconductor imager operably coupled to the processor and comprising:

a sensor array comprising a plurality of pixels arranged in a plurality of rows and a plurality of columns;

a row decoder operably coupled to the sensor array and configured for selecting each row of the plurality of rows; and a column decoder operably coupled to the sensor array and configured for receiving in parallel, at least one signal from each pixel of a selected row, wherein the column decoder further comprises:

a reference signal;

a gain stage amplifier adapted to:

cancel an amplifier offset by coupling a first amplifier output to a first amplifier input and coupling a second amplifier output to a second amplifier input upon assertion of an amplifier reset signal; and amplify the first amplifier input and the second amplifier input upon assertion of a gain select signal;

a buffer element including a buffer input and a buffer output; and a buffer selector having a first buffer switch configured for selectively coupling the first amplifier output to the reference signal when a pixel-reset select signal is asserted and a second buffer switch configured for selectively coupling the second amplifier output to the reference signal when a pixel-sense select signal is asserted.

25. The imaging system of claim 24, wherein the column decoder further comprises a plurality of pixel sensors, each pixel sensor of the plurality including:

a first storage element configured for selective coupling to a column input when the pixel-reset select signal is asserted and selectively coupling to the first amplifier input when a column select signal is asserted;

a second storage element configured for selective coupling to the column input when the pixel-sense select signal is asserted and selectively coupling to the second amplifier input when the column select signal is asserted;

a crowbar switch configured for selectively coupling the first storage element to the second storage element when a crowbar select signal is asserted; and a clamp selector configured for selectively coupling the reference signal to the first storage element when the pixel-reset select signal is asserted and selectively coupling the reference signal to the second storage element when the pixel-sense select signal is asserted.

26. The imaging system of claim 24, further comprising an optical receiver configured to receive and modify incident light and present the modified incident light to the sensor array.

27. The imaging system of claim 24, further comprising:

a memory configured for storing a digital representation of an image captured by the sensor array; and a communication interface configured for communicating the digital representation to an external device.

28. A semiconductor imager, comprising:

a sensor array comprising a plurality of pixels arranged in a plurality of rows and a plurality of columns;

a row decoder operably coupled to the sensor array and configured for selecting each row of the plurality of rows; and a column decoder operably coupled to the sensor array and configured for receiving in parallel, at least one signal from each pixel of a selected row, wherein the column decoder further comprises:

a reference signal;

a differential amplifier having a first amplifier input, a second amplifier input, a first amplifier output, and a second amplifier output;

a first feedback circuit operably coupled between the first amplifier output and the first amplifier input and a second feedback circuit operably coupled between the second amplifier output and the second amplifier input, each of the first and second feedback circuits comprising:

a reset path adapted to couple a feedback circuit input to a feedback circuit output; and a gain path adapted to couple at least one feedback capacitor between the feedback circuit input and the feedback circuit output;

a buffer selector including a first buffer switch configured for selectively coupling the first amplifier output to the reference signal and a second buffer switch configured for selectively coupling the second amplifier output to the reference signal; and a buffer element operably coupled between the buffer selector and the reference signal.

29. The semiconductor imager of claim 28, wherein the column decoder further comprises a plurality of pixel sensors, each pixel sensor of the plurality including:

a first storage element;

a second storage element;

a first pixel switch configured for selectively coupling a column input to the first storage element;

a second pixel switch configured for selectively coupling the column input to the second storage element;

a crowbar switch configured for selectively coupling the first storage element to the second storage element;

a column selector configured for selectively coupling the first storage element to the first amplifier input and selectively coupling the second storage element to the second amplifier input; and a clamp selector configured for selectively coupling the reference signal to the first storage element and selectively coupling the reference signal to the second storage element.

30. An imaging system, comprising:

a processor; and a semiconductor imager operably coupled to the processor and comprising:

a sensor array comprising a plurality of pixels arranged in a plurality of rows and a plurality of columns;

a row decoder operably coupled to the sensor array and configured for selecting each row of the plurality of rows; and a column decoder operably coupled to the sensor array and configured for receiving in parallel, at least one signal from each pixel of a selected row, wherein the column decoder further comprises:

a reference signal;

a first feedback circuit operably coupled between a first amplifier output and a first amplifier input of a differential amplifier and a second feedback circuit operably coupled between a second amplifier output and a second amplifier input of the differential amplifier, each of the first and second feedback circuits comprising a plurality of reset sampling switches, a feedback switch, and a feedback capacitor;

a buffer element operably coupled to the reference signal and configured for selective coupling to the first and second amplifier outputs;

a first buffer switch adapted to selectively couple the first amplifier output to the reference signal; and a second buffer switch adapted to selectively couple the second amplifier output to the reference signal.

31. The imaging system of claim 30, wherein the column decoder further comprises a plurality of pixel sensors, each pixel sensor of the plurality including:

a first storage element having a first terminal and a second terminal;

a second storage element having a first terminal and a second terminal;

a first pixel switch adapted to selectively couple a column input to the first terminal of the first storage element;

a second pixel switch adapted to selectively couple the column input to the first terminal of the second storage element;

a crowbar switch adapted to selectively couple the first terminal of the first storage element to the first terminal of the second storage element;

a column selector adapted to selectively couple the second terminal of the first storage element to the first amplifier input and selectively couple the second terminal of the second storage element to the second amplifier input; and a clamp selector adapted to selectively couple the reference signal to the second terminal of the first storage element and the reference signal to the second terminal of the second storage element.

32. The imaging system of claim 30, further comprising an optical receiver configured to receive and modify incident light and present the modified incident light to the sensor array.

33. The imaging system of claim 30, further comprising:

a memory configured for storing a digital representation of an image captured by the sensor array; and a communication interface configured for communicating the digital representation to an external device.

\* \* \* \* \*

UNITED STATES PATENT AND TRADEMARK OFFICE
CERTIFICATE OF CORRECTION

PATENT NO.         : 7,872,676 B2                                             Page 1 of 1
APPLICATION NO.    : 11/777442
DATED              : January 18, 2011
INVENTOR(S)        : Espen A. Olsen et al.

It is certified that error appears in the above-identified patent and that said Letters Patent is hereby corrected as shown below:

On the Title page, in Item (54), in "Title", in column 1, line 2, delete "CMOC" and insert
-- CMOS --, therefor.

In the Specifications:
In column 1, line 2, delete "CMOC" and insert -- CMOS --, therefor.

Signed and Sealed this
Eighth Day of March, 2011

David J. Kappos
*Director of the United States Patent and Trademark Office*